(12) United States Patent
Fu

(10) Patent No.: US 6,945,677 B2
(45) Date of Patent: Sep. 20, 2005

(54) MANUAL-OPERATION SOUND AND LIGHT EMITTING DEVICE USED IN VEHICLE

(76) Inventor: Fon Hsiung Fu, No. 686, 4 Section, Chang Shui Road, Hsi Hu Chen, Chang Hua Hsien (TW)

( * ) Notice: Subject to any disclaimer, the term of this patent is extended or adjusted under 35 U.S.C. 154(b) by 39 days.

(21) Appl. No.: 10/759,044

(22) Filed: Jan. 20, 2004

(65) Prior Publication Data

US 2005/0157484 A1    Jul. 21, 2005

(51) Int. Cl.$^7$ .............................................. F21V 33/00
(52) U.S. Cl. .................. 362/473; 362/86; 362/540; 340/432; 340/815.7
(58) Field of Search ................................ 362/473, 475, 362/86, 464, 540, 542, 545, 546, 183, 192, 362/193, 208, 227, 394, 234, 253; 340/815.7, 340/432

(56) References Cited

U.S. PATENT DOCUMENTS 5,307,706 A  *  5/1994  Nagano ........................ 74/502.2

FOREIGN PATENT DOCUMENTS

JP    2000025667 A  *  1/2000  ............. B62J 3/00
JP    2000038176 A  *  2/2000  ............. B62J 3/00

* cited by examiner

*Primary Examiner*—Stephen Husar
*Assistant Examiner*—Hargobind S. Sawhney
(74) *Attorney, Agent, or Firm*—Rosenberg, Klein & Lee

(57) ABSTRACT

A manual-operation sound and light emitting device is used in a vehicle, particularly in a bicycle. Moving a movable rod, a gear will rotate. Then steel balls resists against a cover so as to rotate the cover. The rotation of the cover will drive a central rod and a bell body to rotate. Then a coil, a transparent light mask, and a hammer of the bell body displace to touch a block of a seat. By the elasticity of a spring, a hammer will vibrate after passing through the block so as to knock the bell body to emit sounds. A plurality of inclined grooves in the gear and the steel balls cause the bell body to rotate unidirectionally. When the central rod rotates, a coil will be driven. A magnet will cut through positive negative electrode sheets so as to light up LED lights in the bell body.

4 Claims, 5 Drawing Sheets

MANUAL-OPERATION SOUND AND LIGHT EMITTING DEVICE USED IN VEHICLE

FIELD OF THE INVENTION

The present invention relates to a manual-operation sound and light emitting device, and particular to a manual-operation sound and light emitting device used in a vehicle, particularly in a bicycle.

BACKGROUND OF THE INVENTION

The prior art vehicle bell devices have only the function of emitting sounds. The bell device is installed with a hammer, a bell, etc. for emitting sounds by the hammer to knock the bell. However, alarm light devices are developed to be installed to a vehicle, and particular to a bicycle. The alarm light device can emit light to alert others to keep attention to the vehicle installed with the light device. The alarm light device is installed with batteries, lights, etc. for emitting light. However, the bell devices and alarm light devices have unique function. No device is designed to have both functions of lighting up and emitting sounds for being installed to a vehicle.

SUMMARY OF THE INVENTION

Accordingly, the primary object of the present invention is to provide a manual-operation sound and light emitting device used in a vehicle, particularly in a bicycle. Moving a movable rod, a gear will rotate. Then steel balls resists against a cover so as to rotate the cover. The rotation of the cover will drive a central rod and a bell body to rotate. Then a coil, a transparent light mask, and a hammer of the bell body displace to touch a block of a seat. By the elasticity of a spring, a hammer will vibrate after passing through the block so as to knock the bell body to emit sounds. A plurality of inclined grooves in the gear and the steel balls cause the bell body to rotate unidirectionally. When the central rod rotates, a coil will be driven. A magnet will cut through positive negative electrode sheets so as to light up LED lights in the bell body.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
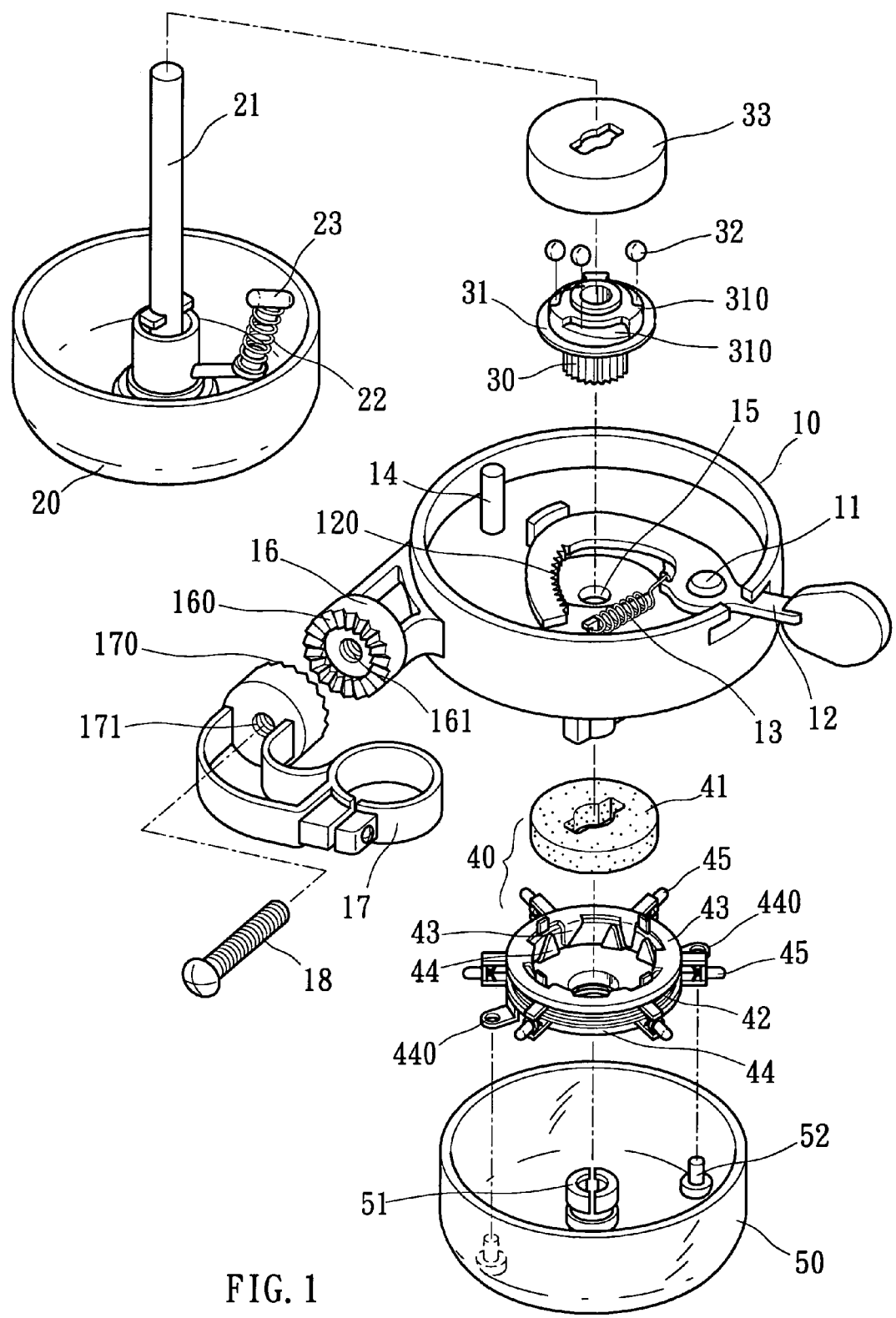
FIG. 1 is an exploded perspective view of the preferred embodiment of the present invention.
Figure 2:
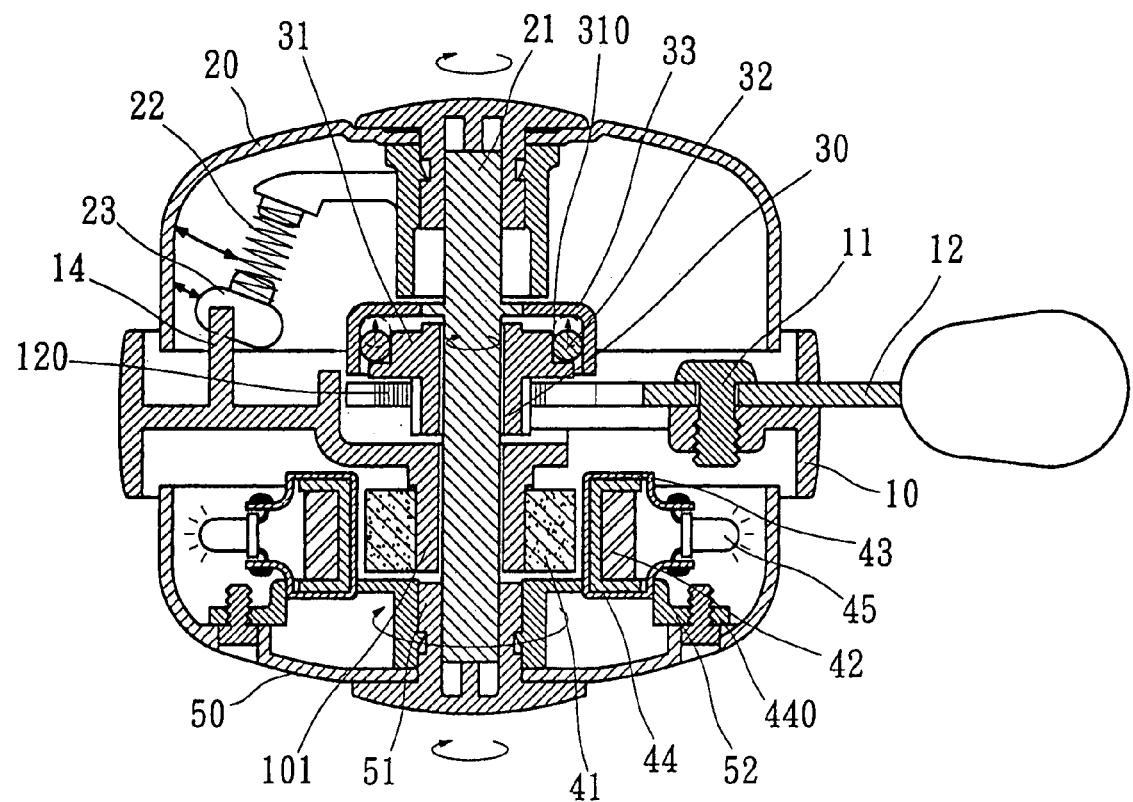
FIG. 2 is an assembled cross section view of FIG. 1.
Figure 3:
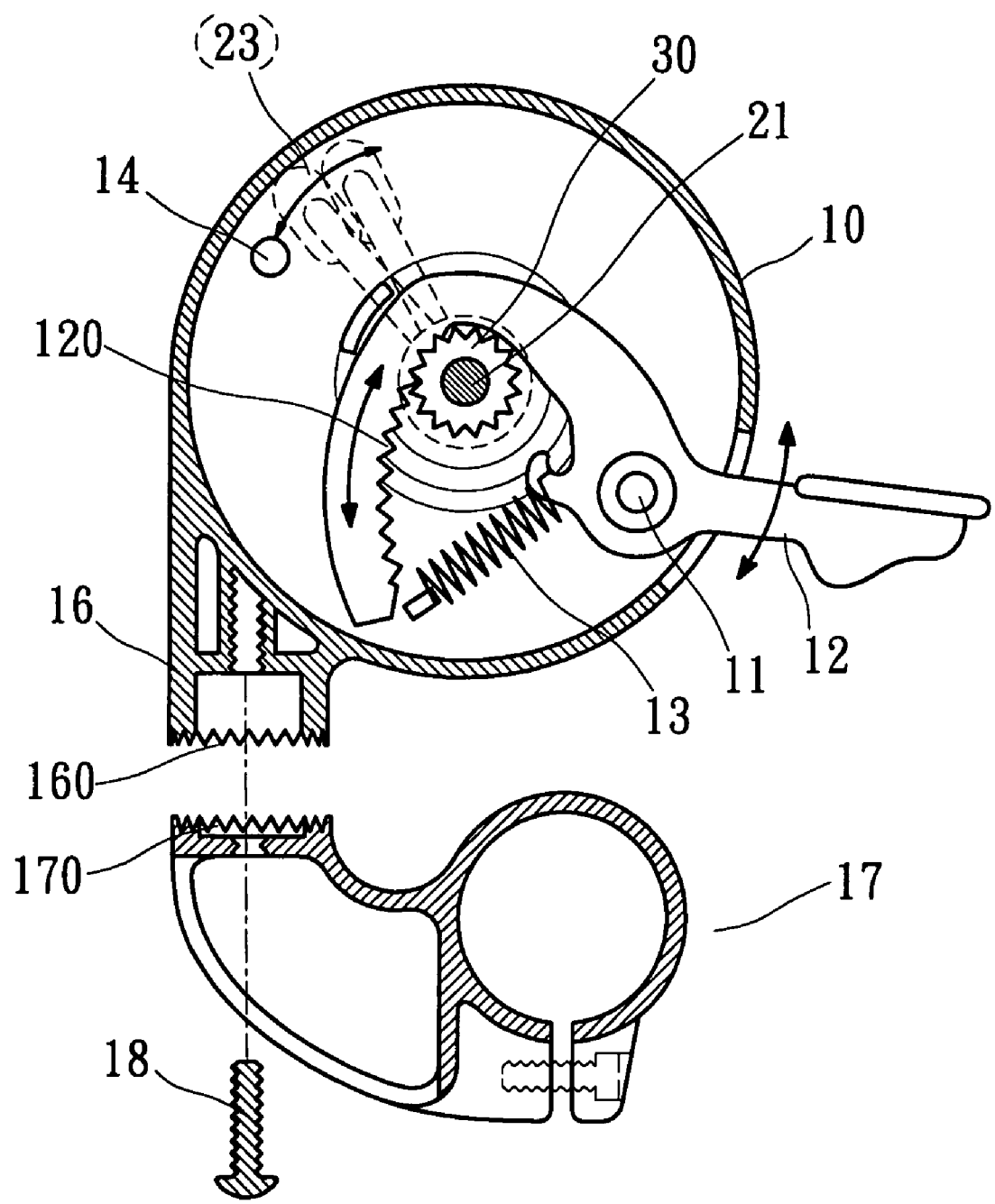
FIG. 3 is a cross section view of the present invention.

Referring to FIG. 1, 2 and 3, the structure of the present invention is illustrated. The manual-operation sound and light emitting device used in a vehicle, especially a bicycle, of the present invention comprises the following elements.

A seat 10 has an axial hole 15 at a center thereof, a shaft 11, a movable rod 12 positioned by the shaft 11, a block 14 positioned near a periphery of the seat 10, a protruding base 16 extending from an outer periphery of the seat 10; an extending sleeve 101 extending from a bottom of the seat 10 for fixing a magnet 41 of a light emitting unit 40. One end of the protruding base 16 is installed with a round rack 160 and a locking hole 161 at a center of the round rack. The movable rod 12 is formed with a dynamic rack 120 and connected to a resilient spring 13.

A locking base 17 serves for being locking to a handle of a bicycle. One end of the locking base 17 is installed with a round rack 170 and a locking hole 171 at a center of the round rack 170. A stud 180 passes through the locking holes 171, 161 so as to combine the two rounds racks 170, 160 Thus the locking base 17 is locked to the seat 10. The orientation of the combinations of the rounds racks 170, 160 are adjustable. The orientation of the lock base 17 is adjusted by rotating one round rack with respect to another one.

A bell body 20 has a spring 22, hammer 23, a central rod 21 passing through the axial hole 15 of the seat 10 so that the bell body 20 is assembled to the seat 10; and a cover 33 having a central hole. The central rod 21 passes through the central hole of the cover 33.

A gear 30 locating on the seat 10 and having a center hole which is passed by the central rod 21 so as to hid within the cover 33. Thereby, the gear 30 is rotatable around the central rod 21. The gear 30 is engaged to the dynamic rack 120 of the movable rod 12. Thereby, by moving the movable rod 12, the gear 30 will rotate so as to drive the cover 33 to rotate. Since the cover 33 is connected to the central rod 21, the bell body 20 rotates. Then the hammer 23 is hindered by the block 14. By the elasticity of the spring 22, the hammer 23 will knock the bell body 20 so as to emit sounds.

A disk base 31 is located above the gear 30. A plurality of inclined grooves 310 are installed around a periphery of the disk base 31. The disk base 31 is covered by the cover 33. Each groove 310 receives a steel ball 32. When the gear 30 rotates, the steel ball 32 will move along the inclined surface of the groove 310 until the steel ball 32 is adhered to and then resists against the cover 33. Thereby, when the gear 30 rotates, the cover 33 can be driven to rotate the central rod 21 and thus the bell body 20. On the contrary, when the movable rod 12 is released, the movable rod 12 will restore to the original position so that the gear 30 rotates reversely and the steel balls 32 does not resist against the cover 33. Thus the cover 33 will not rotate. The central rod 21 and the bell body 20 will not rotate. Thereby, the bell body 20 only rotates unidirectionally and when the bell body 20 returns to the original position, the bell body 20 will not rotate reversely.

A transparent light mask 50 has a central axial base 51. The axial base 51 is assembled with a central rod 21. Thus, the transparent light mask 50 is assembled to a bottom of the seat 10 and is driven to rotate with the central rod 21. Moreover, the transparent light mask 50 has a fixing base 52 for assembling a coil 42 of a power and light generating unit 40.

A power and light generating unit 40 is formed by a coil 42 and a magnet 41. The coil 42 is enclosed by a positive electrode sheet 43 and a plurality of negative electrode sheets 44. A plurality of LED lights 45 are connected between the positive electrode sheet 43 and the negative electrode sheets 44. The power and light generating unit 40 has a plurality of locking sheets 440 for connecting to the fixing base 52 of the transparent light mask 50. The magnet 41 is assembled to the extending sleeve 101 of the seat 10 and is placed in the coil 42 so that the coil 42 rotates with the central rod 21. Thereby, the transparent light mask 50 can be driven so that power can be generated with the positive electrode sheet 43, negative electrode sheets 44 and coil 42. Moreover, the LED lights 45 can light up.

In above embodiment, the bell body can be made of metal.

By above structure, the use of the present invention will be described herein.

(1) The Present Invention has the Function of Emitting Voices and Light

With reference to FIGS. 2 and 3, when the movable rod 12 is moved, the dynamic rack 120 will rotate so as to rotate the gear 30. Then the steel balls 32 resists against the cover 33 so as to drive the cover 33 to rotate. The rotation of the cover 33 will drive the central rod 21 and the bell body 20 to rotate. Then the coil 42, transparent light mask 50, and the hammer 23 of the bell body 20 displace to touch the block 14 of the seat 10. By the elasticity of the spring 22, the hammer 23 will vibrate after passing through the block 14 so as to knock the bell body 20 to emit sounds. When the movable rod 12 is released, the resilience of the spring 22 will cause the movable rod 12 and the dynamic rack 120 to move reversely to the original positions. Thereby, the gear 30 rotate reversely. The steel balls 32 will release from the cover 33. Thereby, the central rod 21 and the bell body 20 will not rotate reversely. Namely, the inclined grooves of the gear 30 and the steel balls 32 cause the present invention to rotate unidirectionally. Thus, when the movable rod 12 is moved, the bell body 20 will rotate. When it restores the original position, the bell body 20 will not rotate reversely. Thereby, the bell body 20 rotates unidirectionally.

When the central rod 21 rotates, the coil 42 of the power and light generating unit 40 will be driven. The magnet 41 will cut through the positive electrode sheet 43 and the negative electrode sheets 44 so as to generate electric power and thus the LED lights 45 light up.

From above description, it is known that other than emitting sounds by the hammer 23 to knock the bell body 20, the present invention has the effects of lighting up LED lights. No battery is used and thus no battery is necessary to be updated.

(2) The Structure May be an Inclined Orientation

Figure 4:
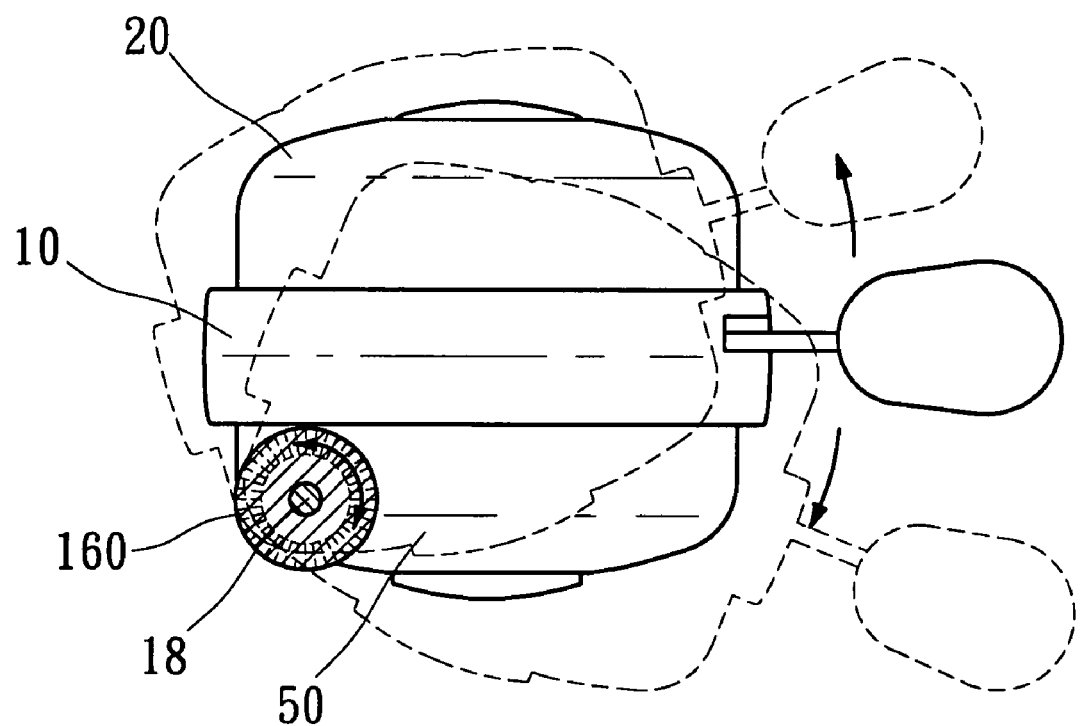
FIG. 4 is a schematic view showing the operation of the present invention.

With reference to FIG. 4, in the present invention, the locking base is locked to a handle of a frame of a bicycle. A round rack (not shown) of the bicycle is engaged to the round rack 160 of the protruding base 16 of the seat 10. Thereby, the stud 18 can be released to rotate the round rack 160 of the protruding base 16 of the seat 10 to a desired locking orientation. Then the bell body 20, seat 10 and the transparent light mask 50 is set to a desired slope, for example, in a vertical orientation, or a horizontal orientation, or in an inclined orientation according to the demand of the user so as to has a preferred effect.

Figure 5:
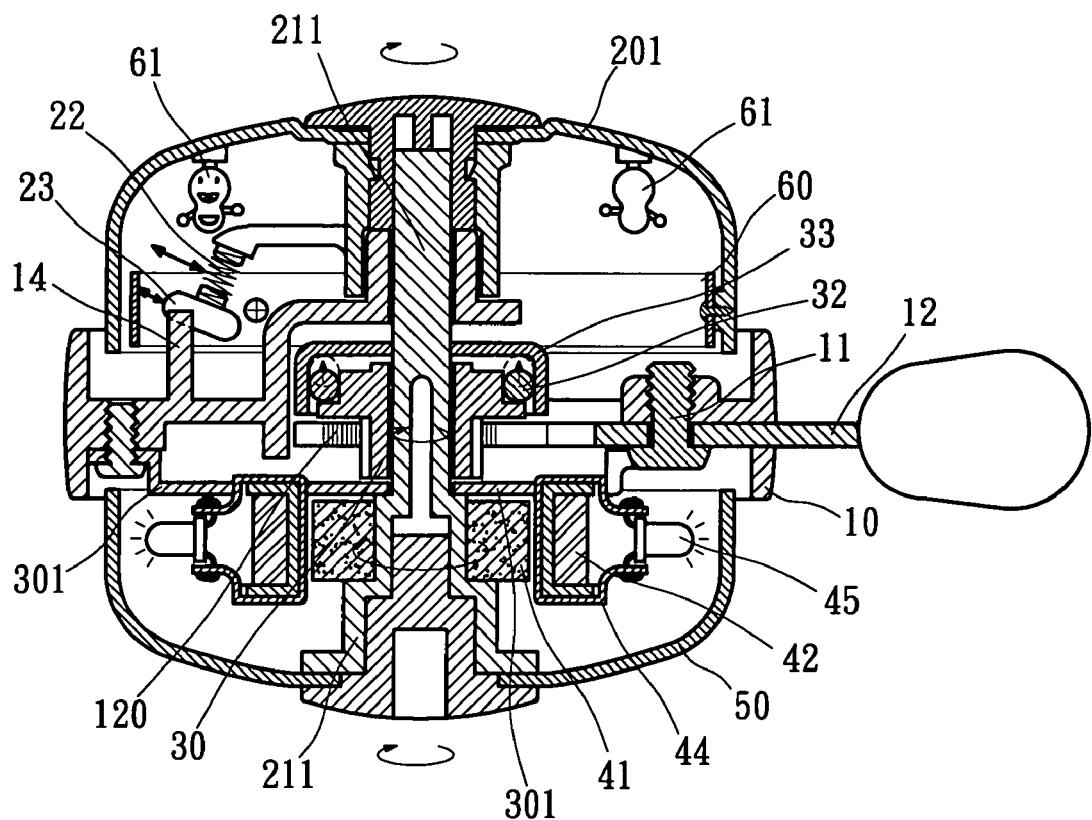
FIG. 5 is a cross section view of another embodiment of the present invention.

In FIGS. 1 and 2, the magnet 41 is fixed and the coil 42 is rotatable. However, in the present invention, it can be designed that the magnet 41 is rotatable and the coil 42 is fixed. Referring to FIG. 5, in this embodiment, the magnet 41 is fixed to the central rod 211. An upper end of the central rod 211 is assembled to the bell body 20 (a transparent rubber mask 201 can be installed thereto). A lower end thereof is firmly secured with a transparent light mask 50. Furthermore, A lower base 301 serves to assemble the coil 42. The lower base 301 is further locked to a bottom of the seat 10. Thereby, the coil 42 is non-rotatable, while the magnet 41 is rotatable with the central rod 211. Thereby, in the present invention, when the gear 30 is rotated, the central rod 21 will rotate therewith so as to achieve the object of emitting sounds and light.

Referring to FIG. 5, in the present invention, the bell body can be formed as a transparent rubber mask 201 with a bell body sheet 60 therein. Thereby, the hammer 23 can knock the sheet to emit sounds. Moreover, decoration 61 can be added to the interior of the rubber mask 201. Moreover, the transparent rubber mask 201 may be colored.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A manual-operation sound and light emitting device used in a vehicle comprising:

a seat having an axial hole at a center thereof, a shaft, a movable rod positioned by the shaft, a block positioned near a periphery of the seat, a protruding base extending from an outer periphery of the seat; an extending sleeve extending from a bottom of the seat for fixing a magnet of a light emitting unit; one end of the protruding base being installed with a round rack and a locking hole at a center of the round rack; the movable rod being formed with a dynamic rack and connected to a resilient spring;

a locking base locked to a handle of a bicycle; one end of the locking base being installed with a round rack and a locking hole at a center of the round rack; a stud passing through the locking holes so as to combine the two rounds racks; and thus the locking base being locked to the seat; the orientation of the combinations of the rounds racks being adjustable; the orientation of the lock base being adjustable by rotating one round rack with respect to another one;

a bell body having a spring, hammer, a central rod passing through the axial hole of the seat so that the bell body being assembled to the seat; and a cover having a central hole; the central rod passing through the central hole of the cover;

a gear locating on the seat and having a center hole which is passed by the central rod so as to hid within the cover; thereby, the gear being rotatable around the central rod; the gear being engaged to the dynamic rack of the movable rod; by moving the movable rod, the gear will rotate so as to drive the cover to rotate; since the cover being connected to the central rod, the bell body rotates; then the hammer being hindered by the block; by the elasticity of the spring, the hammer will knock the bell body so as to emit sounds;

a disk base located above the gear; a plurality of inclined grooves being installed around a periphery of the disk base; the disk base being covered by the cover; each groove receiving a steel ball; when the gear rotates, the steel ball will move along the inclined surface of the groove until the steel ball is adhered to and then resists against the cover; thereby, when the gear rotates, the cover is driven to rotate the central rod and thus the bell body; on the contrary, when the movable rod is released, the movable rod will restore to the original position so that the gear rotates reversely and the steel balls does not resist against the cover; thus the cover will not rotate; the central rod and the bell body will not rotate; thereby, the bell body only rotates unidirectionally and when the bell body returns to the original position, the bell body will not rotate reversely;

a transparent light mask having a central axial base; the axial base being assembled with a central rod; thus, the transparent light mask being assembled to a bottom of the seat and being driven to rotate with the central rod; the transparent light mask having a fixing base for assembling a coil of a power and light generating unit;

a power and light generating unit being formed by a coil and a magnet; the coil being enclosed by a positive electrode sheet and a plurality of negative electrode sheets; a plurality of LED lights being connected between the positive electrode sheet and the negative electrode sheets; the power and light generating unit having a plurality of locking sheets for connecting to the fixing base of the transparent light mask; the magnet being assembled to the extending sleeve of the seat and being placed in the coil so that the coil rotates with the central rod; thereby, the transparent light mask is driven so that power is generated with the positive electrode sheet and the negative electrode sheets cutting through the magnetic field of the coil; the LED lights light up.

2. The manual-operation sound and light emitting device used in a vehicle as claimed in claim 1, wherein the magnet is fixed to the central rod; an upper end of the central rod is assembled to the bell body; a lower end thereof is firmly secured with a transparent light mask; a lower base is assembled with the coil; the lower base is further locked to a bottom of the seat, the coil is non-rotatable, while the magnet is rotatable with the central rod; thereby, in the present invention, when the gear is rotated, the central rod will rotate therewith so as to achieve the object of emitting sounds and light.

3. The manual-operation sound and light emitting device used in a vehicle as claimed in claim 1, wherein the bell body is made of metal.

4. The manual-operation sound and light emitting device used in a vehicle as claimed in claim 1, wherein the bell body is formed as a transparent rubber mask with a bell body sheet therein; thereby, the hammer can knock the sheet to emit sounds.

* * * * *